United States Patent [19]
Smith et al.

[11] Patent Number: 5,835,322
[45] Date of Patent: Nov. 10, 1998

[54] GROUND FAULT INTERRUPT CIRCUIT APPARATUS FOR 400-HZ AIRCRAFT ELECTRICAL SYSTEMS

[75] Inventors: Donald E. Smith, 16991 Lowell Cir., Huntington Beach, Calif. 92649; John F. Rix, Tucson, Ariz.; Ray E. Freudenberg, Tucson, Ariz.; David C. Randolph, Tucson, Ariz.

[73] Assignee: Donald E. Smith, Huntington Beach, Calif.

[21] Appl. No.: 888,783

[22] Filed: Jul. 7, 1997

[51] Int. Cl.⁶ ............................................. H02H 3/16
[52] U.S. Cl. .................................................. 361/45
[58] Field of Search ............................... 361/42, 45, 46, 361/49, 56, 111; 340/649, 650, 664

[56] References Cited

U.S. PATENT DOCUMENTS

| | | | |
|---|---|---|---|
| 3,558,980 | 1/1971 | Florance et al. | 361/45 |
| 3,668,470 | 6/1972 | Ambler et al. | 361/45 |
| 3,978,337 | 8/1976 | Tatsumi | 361/45 |
| 3,996,496 | 12/1976 | Volk, Jr. et al. | 361/50 |
| 4,029,996 | 6/1977 | Miffitt | 307/326 |
| 4,077,056 | 2/1978 | Galiana | 361/50 |
| 4,205,358 | 5/1980 | Washington | 361/44 |
| 4,216,515 | 8/1980 | Van Zeeland | 361/45 |
| 4,353,103 | 10/1982 | Whitlow | 361/45 |
| 4,447,844 | 5/1984 | Schossow et al. | 361/77 |
| 4,722,021 | 1/1988 | Hornung et al. | 361/49 |
| 4,876,622 | 10/1989 | Dougherty | 361/94 |
| 4,888,660 | 12/1989 | Bartelink | 361/49 |
| 4,942,612 | 7/1990 | Wu | 361/49 |
| 5,233,496 | 8/1993 | Morishige | 361/49 |
| 5,241,443 | 8/1993 | Efantis | 361/36 |
| 5,361,183 | 11/1994 | Wiese | 361/42 |
| 5,363,269 | 11/1994 | McDonald | 361/45 |

*Primary Examiner*—Jeffrey A. Gaffin
*Assistant Examiner*—Michael J. Sherry
*Attorney, Agent, or Firm*—Leonard Tachner

[57] ABSTRACT

A resettable ground fault circuit interrupter most advantageously suited for use with 400-Hz aircraft electrical systems and designed to interrupt the AC power between an aircraft electrical system and one or more electrical appliances being operated therein when a ground fault occurs. The circuit relies upon an imbalance sensor which is implemented in the preferred embodiment disclosed herein as a multi-turn coil of a transformer through which input wires connected to an AC input terminal are threaded so that an imbalance resulting from a ground fault can be detected by the coil. The signal generated by the coil as a result of such an imbalance is then amplified and applied to a thyristor, the conducting or non-conducting state of which determines whether or not the circuit is in a configuration for interrupting the AC signal or not interrupting the AC signal. Light emitting diodes are utilized to indicate the interruption status of the circuit. A reset switch is provided to reset the thyristor after an imbalance ceases because of removal of a ground fault that had previously occurred.

6 Claims, 4 Drawing Sheets

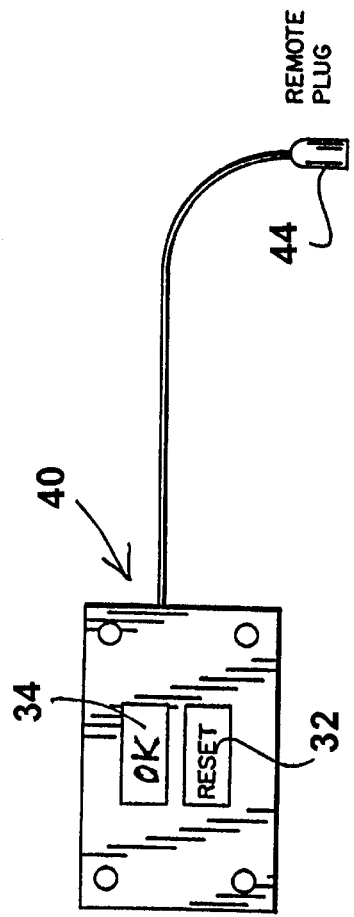
FIG. 4
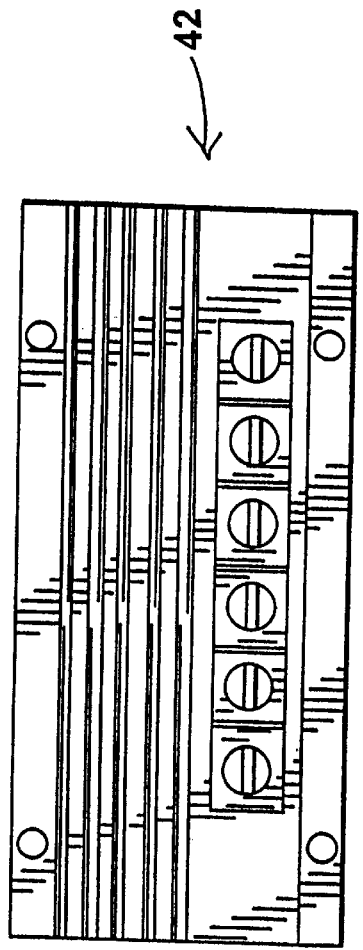
FIG. 5
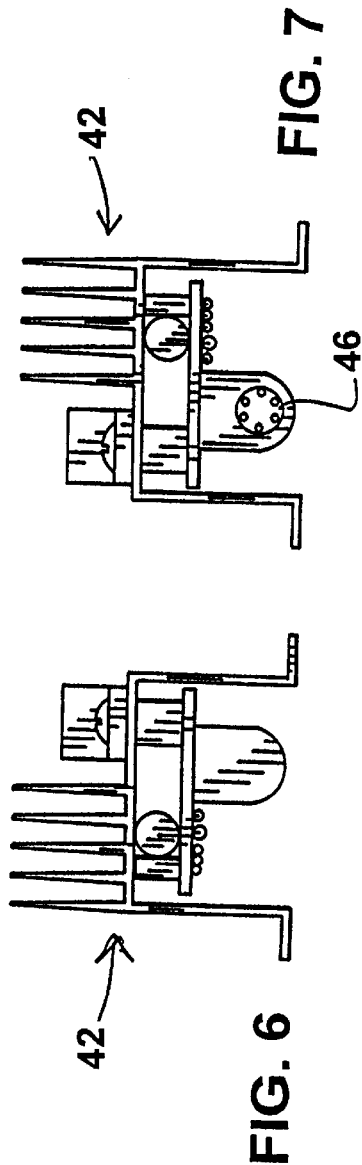
FIG. 6
FIG. 7

GROUND FAULT INTERRUPT CIRCUIT APPARATUS FOR 400-HZ AIRCRAFT ELECTRICAL SYSTEMS

BACKGROUND OF THE INVENTION

1. Field of the Invention

The present invention relates generally to the field of detection and interruption of ground faults in a high frequency electrical system used in airplanes, such as commercial aircraft and the like and more specifically to an automatic ground fault circuit interrupter adapted for operation at an alternating current frequency of 400-Hz, which is commonly used in commercial aircraft, such as for powering galley appliances, including ovens and the like.

2. Prior Art

A ground return circuit is normally provided in electrical installations so that apparatus having a conductive housing may be appropriately placed at ground potential so that anybody handling the electrical device, having a poor ground connection will not incur electrical shocks because of contact with a live wire or hot line of the electrical system. If there is a defect in a grounded device which permits current to flow from a hot line through a metallic housing of an appliance, such as an electrical oven for example, such defect may be of sufficient electrical resistance to appear as an electrical load and not a short circuit and thus not cause overload protection devices, such as circuit breakers to trip and open the circuit. Various devices and circuits for the detection and elimination of ground faults have been disclosed in the prior art. Unfortunately, none of such devices and circuits has been specifically directed to the detection and interruption of ground fault in commercial aircraft which offer unique problems not normally encountered in ground based systems. By way of example, an aircraft electrical system is normally operated at 400-Hz, instead of the usual 60-Hz AC systems normally encountered in everyday appliances and the like. In addition, most of the prior art is directed toward the detection of ground fault interruption in appliances, such as irons, saws, drills, toasters and the like, wherein a ground circuit interruption can be remedied by simply disconnecting the device and bringing it in for repair. However, in a commercial aircraft, the ground fault interruption usually occurs as a result of the aircraft's electrical system and not necessarily because of a fault in an electrical device. When a commercial aircraft is in route, its electrical system is, of course, entirely self-contained and utilizing 400 cycle generators run by the engines of the aircraft to provide electrical power. However, because of the construction of the aircraft, it is entirely possible that a ground interruption may occur, which could endanger the safety of the crew and passengers, despite the fact that the individual apparatus to which the ground electrical system is connected is unaffected by any fault. Accordingly, it is necessary to provide a ground circuit interruption system for commercial aircraft which is capable of operating at the higher 400-Hz frequency of the aircraft electrical system and which may be reset to resume normal electrical operation after the ground interruption has been removed and the electrical system of the aircraft has returned to normal.

A search conducted in the U.S. Patent and Trademark Office in regard to the subject matter hereof has revealed the following references which are deemed to be relevant to the present invention in varying degrees.

3,558,980 Florance et al
3,668,470 Ambler et al
3,978,373 Tatsumi
3,996,496 Volk, Jr.
4,029,996 Miffitt
4,077,056 Galiana
4,205,358 Washington
4,216,515 Van Zeeland
4,353,103 Whitlow
4,447,844 Schossow et al
4,722,021 Hornung et al
4,876,622 Dougherty
4,888,660 Bartelink
4,942,612 Wu
5,233,496 Morishige
5,241,443 Efantis
5,363,269 McDonald U.S. Pat. No. 4,029,996 to Miffitt is directed to a sensitive electrical shock protection circuit for use in an apparatus that may be operated in contact with a portion of the operator's body, the circuit being solid state and does not use a current transformer for fault sensing. The hand held appliance 11 with load 16 includes a touch grid 17 connected to a signal converter 19 that provides a pulse stream proportional to the operator's impedance. If the plug assembly 15 is not connected properly, or if the operator is coupled to the line or neutral of the AC source, the apparatus switch means 45, a solid state line switch is rendered off.

U.S. Pat. No. 3,668,470 to Ambler et al is directed to a ground fault protection device connected between a power supply and a load, the device detects low level leakage and renders the circuit open by using high speed solid state devices. An alternating current line power source 10 supplies a load 16 through sensor and isolation circuit 14. The circuit 14 is supplied, regulated and rectified power from power supply 12 supplied from source 10. A transformer core 52 has line current windings 46, 48 connected in opposition so that equal current lines 17, 18 will cancel resulting in no difference signal supplied to winding 50. A current, like a leakage current, which is in one supply line and not the other will not be canceled out by windings 46, 48 resulting in line 50 having a signal, which is supplied to the amplifier so as to gate silicon controlled rectifier 80 on, resulting in the gating circuit for SCRs 122, 124 being clamped off and the load isolated from the power supply.

U.S. Pat. No. 3,558,980 to Florance is directed to an embodiment of a ground fault detector using electronic control. A transformer 12 with primary windings 13, 14 in the supply and neutral line are polarized to cancel the load current flow connected at terminals 9, 10. In normal operation, SCR 46, 47 in back-to-back connection in series with the load are continuously gated and supply line current to the load. A ground fault unbalances the transformer 12 causing the gating circuit to stop supplying the SCRs, resulting in the line opening to the load.

U.S. Pat. No. 4,942,612 to Wu is directed to a leakage current preventing means for a dryer connected to an AC source using solid state touch control circuitry and solid date power switching circuits. The solid state touch control circuitry 3 has circuit 31 connected to a touch pad 32 for turning on triacs 41, 42 to operate the dryer. Sensor 52 on body 1 is connected to leakage current detector 5 for sensing a change in impedance and inhibiting the touch control circuitry to insure the triacs 41, 42 do not turn on during this high leakage state.

U.S. Pat. No. 5,241,433 to Efantis is directed to a transformer fault protection device using a conductive plate on a high voltage transformer having two secondaries. The neon transformer 12 with secondary windings 22, 24 connected in series with the mid-points connected to ground has a metal plate 30 spaced equally from the secondary windings so normal operation induces equal but opposite voltage in the plate and no net induced voltage results. If a tube breaks, a short occurs, or the transformer fails, the plate will result with an induced voltage which is supplied to comparator 80 which results in turning off the Q3 and turning off the transformer.

From the foregoing, it can be seen that there is no prior art disclosure of a ground fault interrupt circuit which is suitable for use in commercial aircraft, because none of the aforementioned prior art disclosures relates to a 400-Hz system, nor to a system which is readily adaptable for being reset for resuming normal operation after a ground fault has been corrected.

SUMMARY OF THE INVENTION

The present invention overcomes the aforementioned disadvantages of the prior art by providing a resettable ground fault responsive interrupt circuit for an aircraft electrical system. The circuit comprises an AC input from the electrical system of an aircraft, a current imbalance sensor connected to the aircraft AC input for generating an imbalance output in response to a ground fault in the aircraft electrical system, an AC output connected to one or more appliances, a pair of silicon controlled rectifiers connected between the AC input and the AC output for selectively passing AC current therebetween in response to gate signals, an isolator for selectively conducting the gate signals, an amplifier connected to the sensor and a thyristor having a gate electrode connected to the amplifier for causing the thyristor to conduct in response to an imbalance output from the sensor, causing the isolator to turn off in response to the conducting state of the thyristor and turning on the isolator in response to the thyristor not conducting. A first light emitting device, such as an LED, is connected in relation to the thyristor for emitting light when the thyristor is not conducting. A second light emitting device, such as an LED, is connected across the AC output for emitting light when the thyristor is conducting and for not emitting light when the thyristor is not conducting. The circuit also comprises a reset switch connected in parallel with the thyristor for resetting thyristor after the ground fault is removed.

Unlike the prior art previously described, the circuit of the present invention is configured for operating at an AC frequency of 400-Hz, which is the standard electrical system operating frequency of commercial aircraft. Thus, the present invention is suited to operate in conjunction with aircraft electrical systems and to provide an AC output at the aircraft electrical system frequency which is automatically interrupted when the sensor senses an imbalance due to a ground fault.

In the preferred embodiment of the invention described herein, the sensor comprises a transformer coil through which the AC input wires are threaded, so that when the current in the AC input wires is imbalanced, due to a ground fault, the transformer coil generates an output voltage which is applied to the amplifier, which in turn, turns on the thyristor and interrupts the isolator which causes the silicon controlled rectifiers to cease conducting and thus turn off the AC output. The reset switch permits the operator to turn off the thyristor and if the ground fault has been removed, the thyristor remains off and the circuit permits the AC output to again be applied to any appliances connected to the circuit of the present invention. Unlike the prior art previously described, the present invention permits the interrupter to be reset in response to the removal of an AC ground fault, thereby permitting normal performance of the electrical system in conjunction with one or more appliances connected thereto. On the other hand, if the ground fault is sustained, the circuit of the present invention will continue to prevent the AC output from being generated and thus turn off power to all appliances connected to the circuit, thereby shielding the user, such as airline flight attendants and crew from danger of shock and the like. Furthermore, the present invention is faster and more sensitive (and thus safer) than prior art ground fault interrupters.

OBJECTS OF THE INVENTION

It is therefor a principal object of the present invention to provide an approved resettable ground fault interrupter circuit adapted for use in conjunction with aircraft electrical systems for automatically interrupting AC current to appliances connected thereto in an aircraft, upon the occurrence of a ground fault.

It is an additional object of the present invention to provide a resettable ground fault interruption circuit adapted especially for use in aircraft in conjunction with electrical systems therein and having a reset capability for re-initiating the AC output in response to removal of the ground fault in the aircraft.

It is still an additional object of the present invention to provide a ground fault interrupt circuit adapted to operate at electrical frequencies normally associated with the electrical systems of aircraft, such as 400-Hz.

BRIEF DESCRIPTION OF THE DRAWINGS

The aforementioned objects and advantages of the present invention, as well as additional objects and advantages thereof will be more fully understood hereinafter as a result of a detailed description of a preferred embodiment of the invention when taken in conjunction with the following drawings in which:

FIG. 4 is a front view of a portion of the present invention shown in a separate module, having a remote plug;

FIG. 5 is an elevational front view of the remaining portion of the present invention shown in a module separate from the module of FIG. 4; and FIGS. 6 and 7 are respective side views of the module of FIG. 5.

DETAILED DESCRIPTION OF A PREFERRED EMBODIMENT

Figure 1:
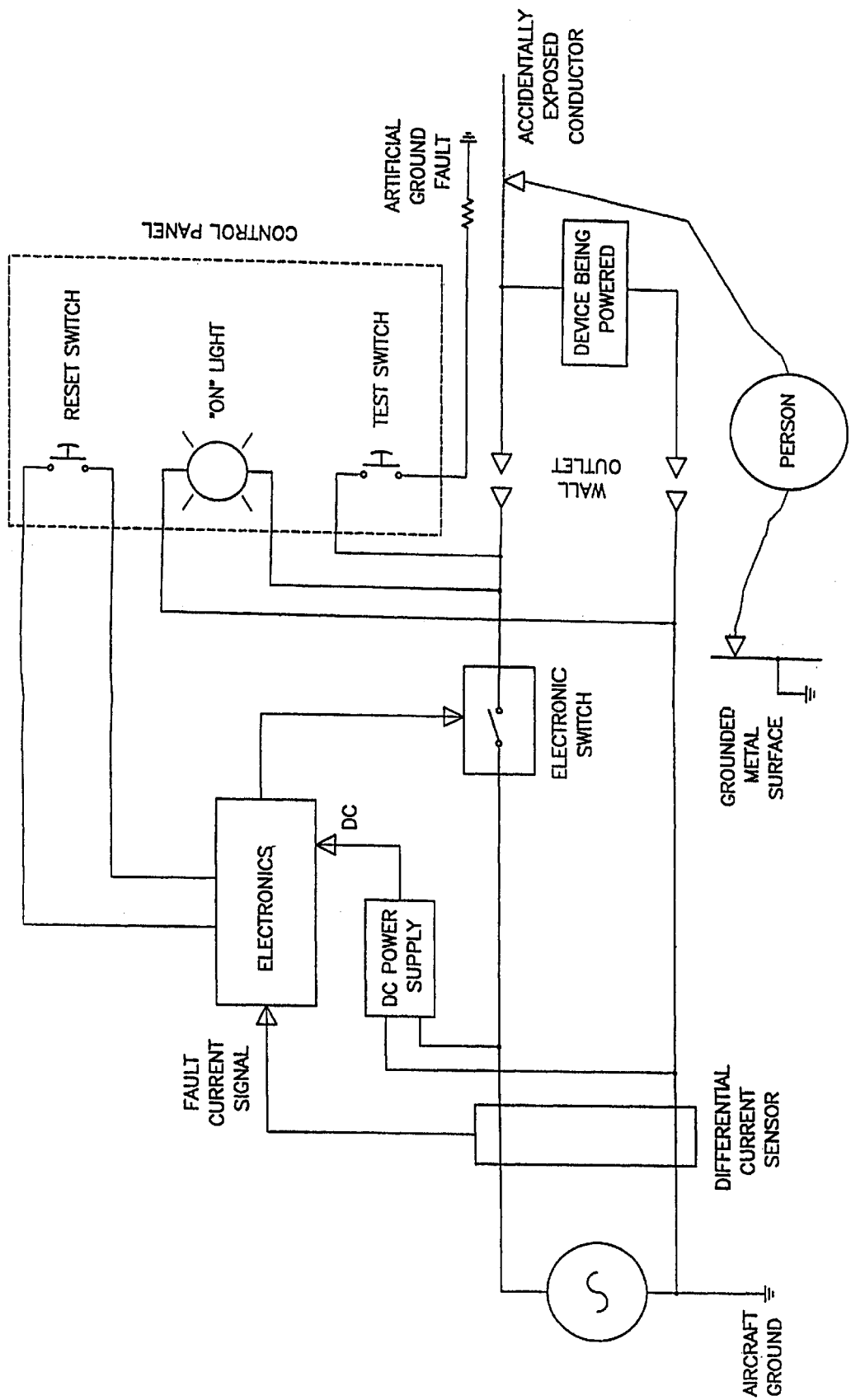
FIG. 1 is a block diagram of the ground fault circuit interrupt of the invention.

As shown in FIG. 1, the ground fault circuit interrupter (GFCI) of the invention, in a preferred embodiment, consists of three functional units:

1) a sensor/control unit;

2) a direct-current power supply for powering the sensor/control unit; and 3) a unit for switching the 120 V, 400-Hz AC power output on or off, under control of the sensor/control unit.

Most of the circuit is contained within a closed module designed to be wired into the power distribution system of the aircraft, mounted in an out-of-the-way location. There is a second module in the form of a small panel, to be mounted on a bulkhead in an accessible location. This panel contains a green pilot light, indicating normal operation, and a push-button switch with red illumination, with a "Reset" label, indicating that a fault has been sensed and power has been switched off.

The features of this GFCI are:

1) suitability for use in a 400-Hz power distribution system;

2) solid-state (thyristor) switching of output power, enabling output to be turned off within less than one power cycle (2.5 ms) after occurrence of a ground fault of magnitude great enough to be detected; and 3) detection of ground fault currents in the range of 2.0 to 3.0 milliamperes (mA), significantly less than the Underwriters Laboratories requirement of 6 mA.

The second and third features combine to virtually eliminate any sensation of electric shock due to ground fault. The Underwriter's value of 6 mA provides protection against dangerous levels of shock, but allows the person experiencing the ground fault to receive an uncomfortable and possibly startling shock sensation.

Figure 2:
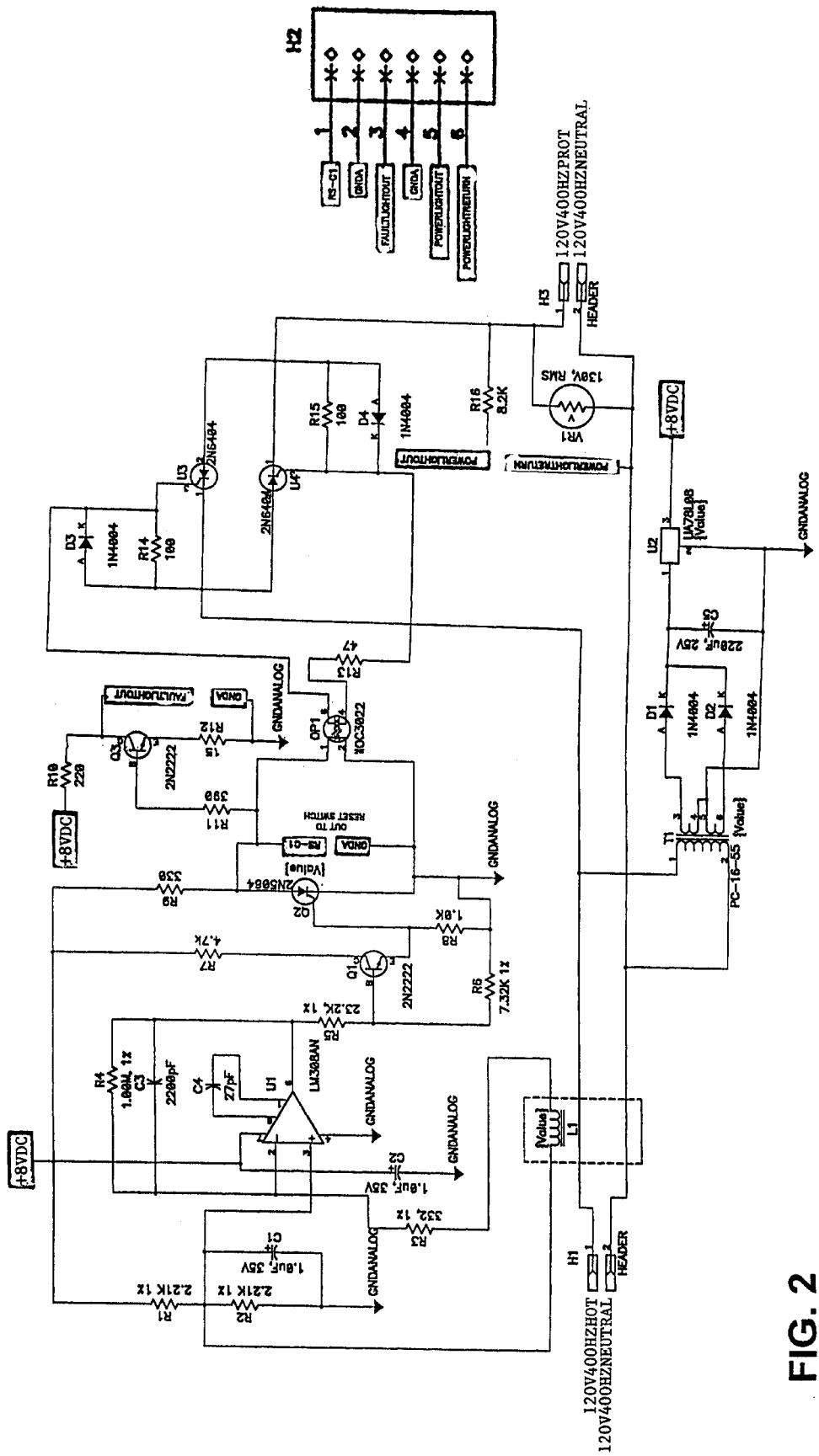
FIG. 2 is a schematic drawing of the circuit of the present invention.

Referring to FIG. 2, the two conductors carrying incoming power, 120 V400-HZHOT and 120 V400-HZNEUTRAL (called HOT and NEUTRAL, respectively, hereinafter) are threaded through the center opening of a coil of wire wound in the form of a toroid, L1. This assembly forms a transformer, used as a transducer (sensor) to sense ground fault current in any portion of a wiring system connected to the output terminals of the GFCI, or any electrical device connected directly or indirectly to the output terminals of the GFCI.

In the absence of a ground fault, the currents in the two power lines passing through the toroidal coil, are equal in magnitude and opposite in direction at every instant of time. Thus, the transformer produces no output signal. In case of a ground fault, some or all of the input current in the HOT line is shunted to the aircraft ground system, and returns to the power source (alternator) through this ground path, rather than through the NEUTRAL line. This shunt is often formed in part by the body of a person, and thus constitutes an electrical shock hazard. The NEUTRAL line then carries less current than the HOT line. Since the HOT and NEUTRAL lines no longer carry currents of equal magnitudes, the transformer produces a sinusoidal output signal voltage, which is proportional in amplitude to the difference between the currents in the two lines passing through the toroidal coil.

The signal from the sensor transformer L1 is amplified by a circuit portion consisting of operational amplifier U1, resistors R1, R2, R3, and R4, and capacitors C1, C2, C3 and C4. Resistors R1 and R2 form a voltage divider which biases the amplifier to a dc level equal to one-half the dc power supply voltage. This enables both the positive and negative voltage swings of the signal from transformer L1 to be amplified without causing saturation of operational amplifier U1. Resistors R3 and R4 establish the gain of the amplifier circuit, while the capacitor C3 acts with resistor R4 to form a lowpass filter, so that the circuit will not respond to high-frequency harmonics of the power line frequency or to transients on the power line.

The amplified, biased output of the amplifier circuit passes through a voltage divider consisting of resistors R5 and R6. This shifts the bias level downward, to a level suitable for input to the emitter follower consisting of transistor Q1 and resistors R7 and R8. This emitter follower amplifies the very small output current from the operational amplifier circuit just described, so that enough current will be available to reliably trigger the silicon controlled rectifier (SCR), Q2, in the circuit portion to be described below. SCR Q2 is also referred to herein as a thyristor as a more generic term for a voltage triggerable switch.

In the absence of a ground fault, current flows through resistor R9 and then through the light-emitting diode (LED) in the input section of the optically-isolated switch ("opto-switch") OP1. In this case, no current flows through SCR Q2. The value of resistor R9 is chosen so that the voltage applied to the LED of OP1 is sufficient to allow this LED current to flow. The purpose of this LED operation will be explained below. The bias level of the emitter follower is set so that in the absence of a ground fault signal, the voltage at the gate of SCR Q2 (DC in this case) is held at a value somewhat below the tripping level of Q2, preventing Q2 from conducting.

When a ground fault occurs, a sinusoidal AC voltage is superimposed on the DC bias level at the gate of SCR Q2; as explained earlier, its amplitude is proportional to that of the fault current. If the negative-going portion of this wave happens to occur first, it has no effect on Q2. The positive-going portion, if the ground fault current is large enough, causes the voltage at the gate of SCR Q2 to reach and begin to exceed the value at which Q2 trips. Q2 immediately begins to conduct heavily from its anode to its cathode. This shunts the current flowing through resistor R9 away from the LED of opto-switch OP1, so that the LED ceases to emit light.

Figure 3:
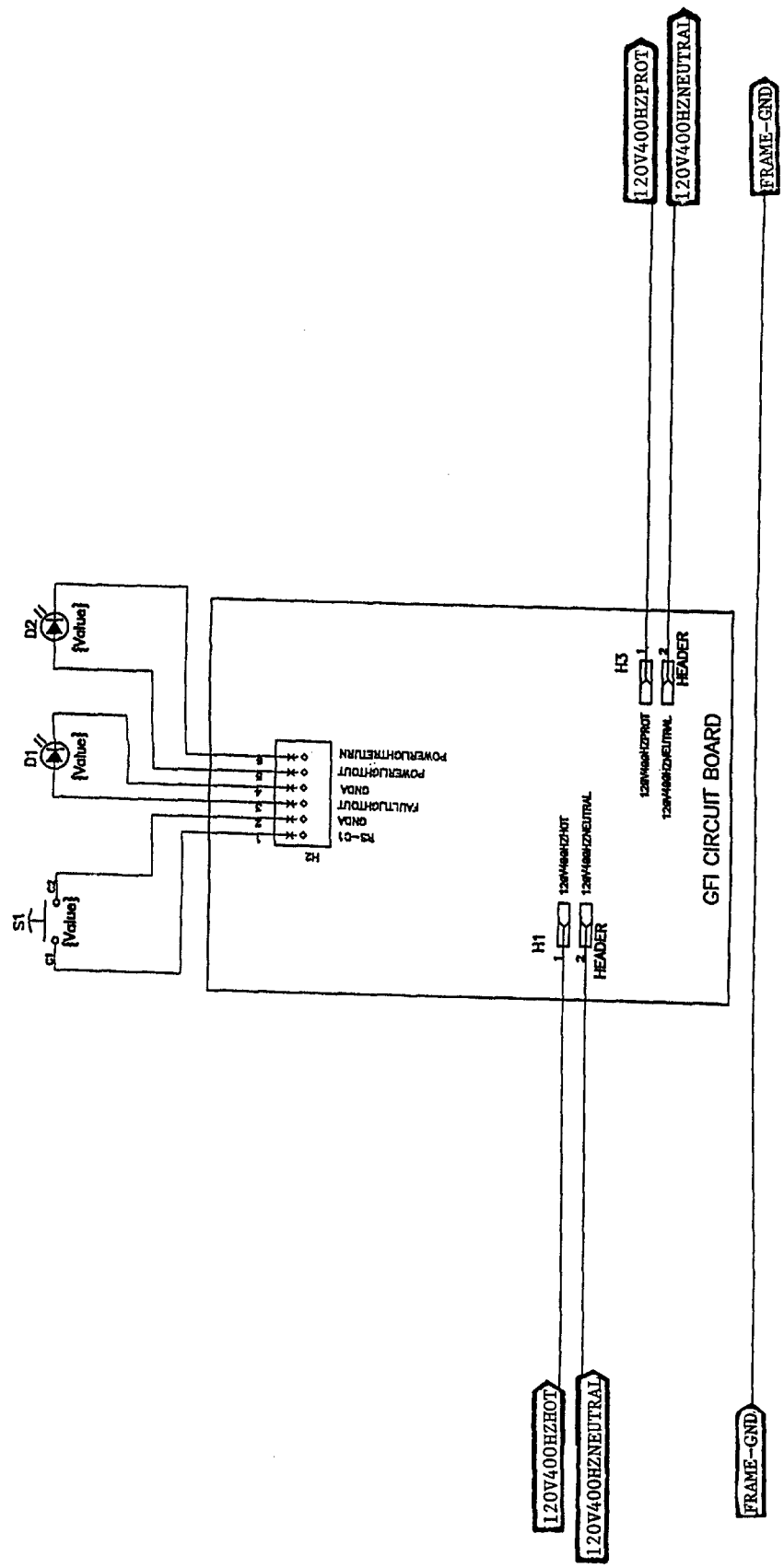
FIG. 3 is a schematic drawing of a display and switch panel of the invention.

Once tripped, SCR Q2 remains in the conducting state until externally reset. The importance of this will be explained below. Conduction ceases only if the current through the SCR is stopped by some external means. In the present circuit, that is accomplished with the illuminated push-button switch S1 (see FIG. 3), located on the bulkhead-mounted second module mentioned earlier. This switch short circuits SCR Q2, starving it of the current needed to keep it conducting.

The illumination in switch S1 is provided by red LED D1 (FIG. 3), which is controlled by an inverting amplifier in the main module, consisting of transistor Q3 and resistors R10, R11 and R12. The input to this subcircuit is the same voltage that is applied to the LED in the input section of opto-switch OP1. Since the amplifier inverts, the red LED D1 (FIG. 3) in switch S1 is turned OFF as long as this voltage is high enough for the LED in opto-switch OP1 to be turned ON (that is, when there is no ground fault). When a ground fault causes this voltage to fall, turning the LED in OP1 OFF, the amplifier turns the red LED in switch S1 ON, in order to attract attention.

The sensor/control section of the GFCI requires 8 volts of direct current in order to operate. This power is provided by a small power supply, located entirely in the main module. It consists of center-tapped transformer T1, rectifier diodes D1 and D2 in a full-wave configuration, filter capacitor C5 and voltage regulator U2. Transformer T1 takes its AC input directly from the power input lines of the GFCI, after they have passed through the toroidal ground fault sensor, L1.

After passing through toroidal sensor L1, the HOT input power line reaches a pair of power SCRs, U3 and U4, connected back-to-back. The line leading from this SCR pair to the HOT output terminal of the GFCI is considered the HOT power output line. The two SCRs act as switches, allowing power to pass from input to output during normal conditions, but blocking it when the sensor/control unit determines that a ground fault is present. The NEUTRAL line proceeds from its input terminal, though toroidal ground fault sensor L1, and directly to the NEUTRAL output terminal, without being switched.

Resistors R13, R14 and R15, diodes D3 and D4, and the output section of opto-switch OP1 form a network that determines whether or not the power SCRs, U3 and U4, allow the passage of current to the output. The output section of OP1 is the switching section, consisting of an optically-controlled triac. When the LED of the input section produces light, due to current flowing through it, the output triac is switched ON, so that control current can flow through the remainder of the SCR control network. Resistor R13 serves to limit the current of this network to small, non-destructive values.

In the absence of a ground fault, each of the power SCRs conducts current to the output during one half of each AC power cycle. Each SCR switches itself OFF at the end of its half-cycle, as the AC output current declines and passes through zero. During the other half-cycle, the other SCR conducts the output current. The network consisting of resistor R14 and diode D3 on one side and resistor R15 and diode D4 on the other allows this to happen as long as control current can circulate from one side to the other though resistor R13. It does this by providing the gate voltage to each SCR of the pair at the right time to trigger it at the start of its half-cycle. As discussed above, each SCR continues to conduct, once triggered, until its current is cut off.

When a ground fault occurs, current ceases to flow in the input LED of opto-switch OP1, as discussed earlier. Since the LED no longer illuminates the output triac, the output is switched OFF. Control current can no longer flow from one side of the output SCR triggering network to the other, so the output SCRs can no longer be triggered ON when their respective half-cycles of the AC wave arrive. Thus, no power is available at the output terminals.

The green pilot LED, D2 (FIG. 3), located in the bulkhead-mounted second module, is powered directly from the output terminals, through current-limiting resistor R16 (FIG. 2). Thus it indicates as directly as possible the status of the output power.

Varistor VR1 is connected directly across the output terminals. It serves to limit voltage "spikes" that could be generated on the output line by connected electrical devices being switched on and off. Such spikes, if large enough, could cause false tripping of the GFCI.

It has been shown that the triggering of SCR Q2 initiates a chain of events causing power at the output terminals of the GFCI to be switched off. When this happens, ground current no longer flows, whether or not the condition that caused the ground fault remains in effect. (The circuitry within the GFCI continues to be powered, and continues to function). The fault signal at the gate of SCR Q2 thus vanishes, leaving only the DC bias voltage. If Q2 did not have SCR behavior, it would cease to conduct, initiating a new chain of events so that power would be switched back on at the output terminals. Power would then be reapplied to the ground fault, if it still existed, and the shock hazard would exist again, defeating the purpose of the GFCI. Of course, the GFCI would trip and switch off the output again, but the fault hazard would come and go, at a rapid rate.

The reason for using an SCR in the position of Q2 in the circuit is that an SCR remains latched in the conducting state once placed there, until the current though it is interrupted by some means external to the SCR. As explained above, that requires human intervention in the case of the GFCI circuit disclosed herein. This provides the opportunity to remove the cause of the ground fault before acting to restore output power.

Another unique characteristic of the present invention may be better understood by referring now to FIGS. 4 through 7. More specifically, as seen in FIGS. 4 through 7, the circuit of the present invention is divided between a first module 40 and a second module 42, the former having a remote plug 44 adapted to mate with a connector 46. In this manner, module 42 may be positioned in a location that is out of view and more convenient for connection to the electrical system of the aircraft and to one or more appliances being operated by that electrical system. At the same time, it is possible to position the module 40 with its reset switch 32 and OK LED 34, so that they are readily observable and available at an exterior location where access to the switch 32 and LED 34 can be readily provided.

Those having skill in the art to which the present invention pertains, will now as a result of the description herein provided, understand that the present invention comprises a resettable ground fault circuit interrupter most advantageously suited for use with aircraft electrical systems and designed to interrupt the AC power between an aircraft electrical system and one or more electrical appliances being operated therein when a ground fault occurs. The circuit of the present invention relies upon an imbalance sensor which is implemented in the preferred embodiment disclosed herein as a multi-turn coil of a transformer through which input wires connected to an AC input terminal are threaded so that an imbalance resulting from a ground fault can be detected by the coil. The signal generated by the coil as a result of such an imbalance is then amplified and applied to a thyristor, the conducting or non-conducting state of which determines whether or not the circuit is in a configuration for interrupting the AC signal or not interrupting the AC signal. Different colored light emitting diodes are utilized to indicate the interruption status of the circuit of the present invention. A reset switch is provided to respectively reset the thyristor after an imbalance ceases because of removal of aground fault that had previously occurred.

Those having skill in the art to which the present invention pertains, will now as a result of the applicant's teaching herein, perceive various modifications and additions which may be made to the invention. By way of example, the specific components shown herein in a preferred embodiment of the invention, may be readily altered by those having skill in the electrical arts while still achieving the objectives of the invention disclosed herein. Accordingly, all such modifications and additions which may be made to the invention are deemed to be within the scope of the claims appended hereto and their equivalents.

We claim:

1. A resettable ground fault responsive interrupt circuit for a 400-Hz aircraft electrical system, the circuit comprising:

an AC input from said aircraft electrical system;

a current imbalance sensor connected to said input for generating an imbalance output in response to a ground fault in said aircraft electrical system;

an AC output;

a pair of SCRs connected between said AC input and said AC output for selectively passing AC current therebetween in response to gate signals;

an isolator for selectively conducting said gate signals;

amplifying means connected between said sensor and said isolator for turning off said isolator in response to an imbalance output from said sensor; and a reset switch for resetting said amplifying means and turning on said isolator after removal of said ground fault.

2. The circuit recited in claim 1 wherein said amplifying means comprises an amplifier connected to said sensor and a thyristor having a gate electrode connected to said amplifier for causing said thyristor to conduct in response to an imbalance output from said sensor; said isolator turning off in response to said thyristor conducting and turning on in response to said thyristor not conducting.

3. The circuit recited in claim 2 wherein said reset switch is connected in parallel with said thyristor for resetting said thyristor and said circuit after said ground fault is removed.

4. The circuit recited in claim 2 further comprising a first light emitting device connected in parallel with said AC output for emitting light when said thyristor is not conducting and for not emitting light when said thyristor is conducting.

5. The circuit recited in claim 4 further comprising a second light emitting device connected for emitting light when said thyristor is conducting and for not emitting light when said thyristor is not conducting.

6. The circuit recited in claim 5 wherein said first and second light emitting devices emit different colors of light for indicating a no ground fault condition and a ground fault condition, respectively.

* * * * *